Nov. 28, 1950 R. D. PARKS 2,532,033
FOOD CONDITIONING APPARATUS
Filed Dec. 4, 1946 2 Sheets-Sheet 1
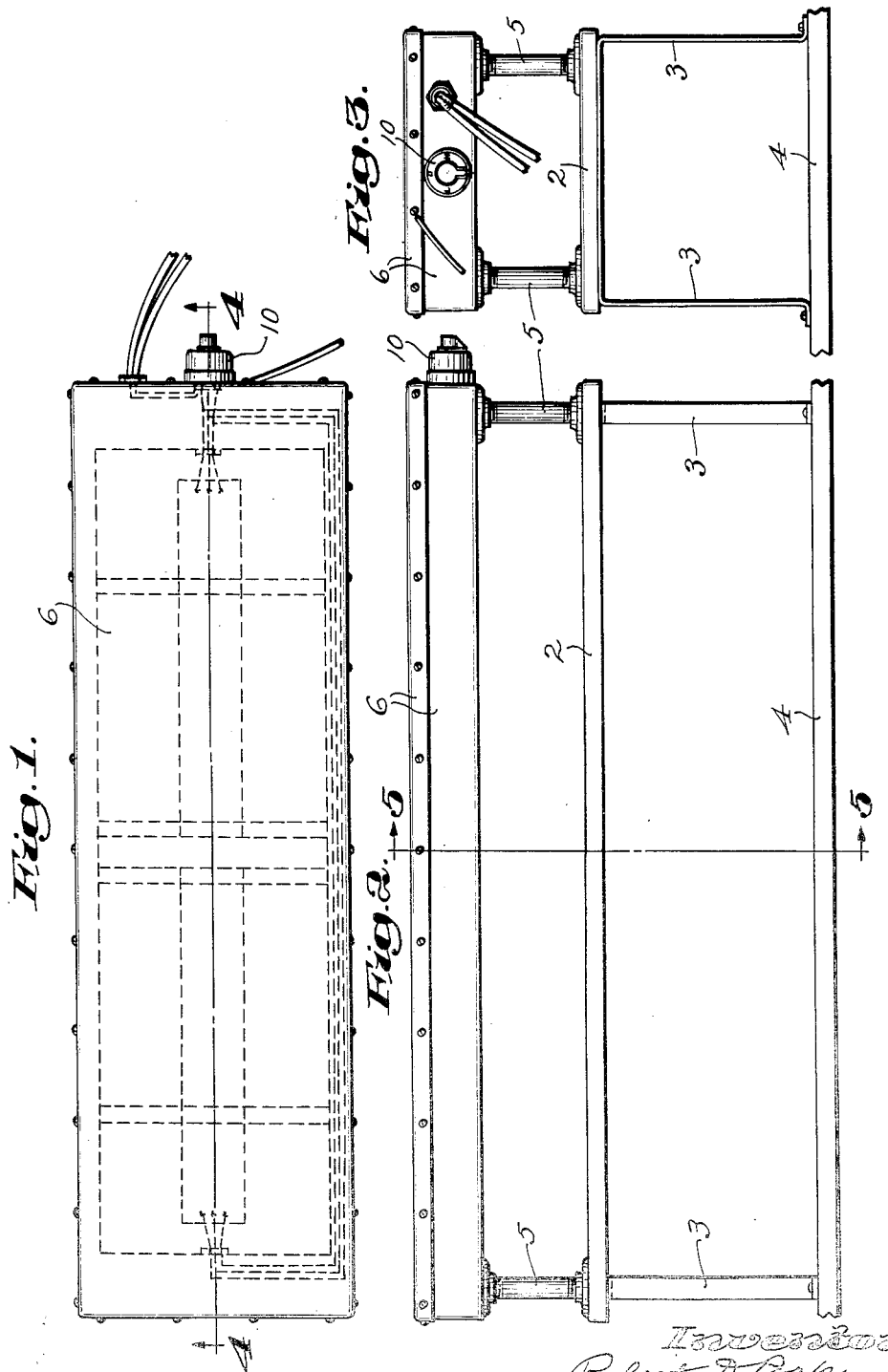

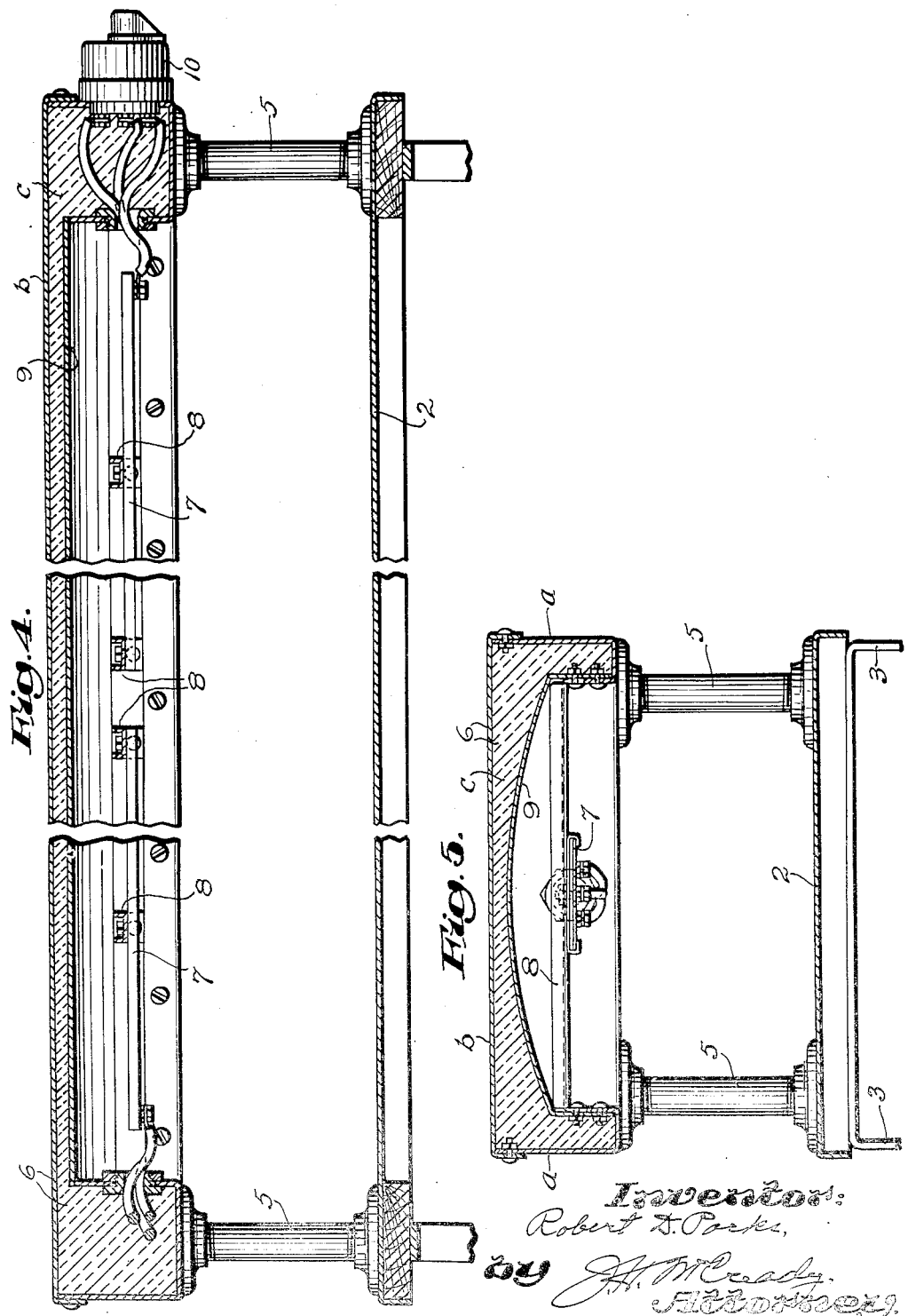

Patented Nov. 28, 1950

2,532,033

UNITED STATES PATENT OFFICE 2,532,033

FOOD CONDITIONING APPARATUS

Robert D. Parks, Concord, Mass.

Application December 4, 1946, Serial No. 713,995

1 Claim. (Cl. 219—34)

In hotels, restaurants, and other eating establishments, one of the problems is to serve the meals to the diners or customers while the food is still hot. The usual practice in handling an order is for one or more of the cooks to prepare the required food, place it in the necessary dishes, and then to set them on the sideboard or counter where they should shortly be picked up by the waiter. During rush periods it may be five or ten minutes, and frequently longer, before the waiter can serve the order so prepared to the customer. During that waiting period the food may cool off to such a degree that it is not in the condition in which either he, or the proprietor of the restaurant, wishes to have it served.

This is a situation known only too well to the managers and proprietors of restaurants and other eating plates. While it has been attempted to minimize these difficulties through the use of warming ovens, this expedient has not proved satisfactory for several reasons. Among them may be mentioned the fact that such ovens tend to dry out the food; the use of them involves extra travel by the cooks and waiters, and it is usually necessary to place them in such locations that cross-traffic is created which tends to slow up the whole program.

The present invention is especially concerned with this problem, and it aims to devise a thoroughly practical solution for it.

The nature of the invention will be readily understood from the following description when read in connection with the accompanying drawings, and the novel features will be particularly pointed out in the appended claim.

In the drawings,

Fig. 1 is a plan view of a food conditioning apparatus embodying this invention;

Fig. 2 is a side elevation of said apparatus;

Fig. 3 is an end elevation of it; and

Figs. 4 and 5 are sectional views taken, respectively, on the lines 4—4 of Fig. 1 and 5—5 of Fig. 2.

The apparatus shown in the drawings comprises a flat support or base 2 adapted to support the dishes containing the food to be served to the customers. Preferably this support forms the top of an elongated table including legs 3—3 and a sub-base 4. Mounted on the base, and supported by posts 5, is a casing 6 overlying approximately the entire area of the base but spaced above it by a substantial distance, both sides of the space between the casing and the base being open so that the containers for the food may be conveniently placed on it at any point in the length of one side thereof and removed therefrom at the opposite side. The base should be long enough to accommodate several persons simultaneously at each side.

Approximately centered laterally in the casing, and extending longitudinally thereof, is an electric heating unit 7. In the present instance this unit consists of two sections each, for example, two and a half or three feet long, and located approximately end to end with a narrow space of, perhaps, an inch or two separating them, so that they function, from a heating standpoint, as a single unit. The unit is bolted to the lower sides of several channel bars 8 which are fastened securely to the opposite sides of the casing. An important element of this casing is a reflector 9, of concave form in vertical, transverse section, and so related to the heating unit that it reflects the heat generated therein downwardly against the base 2, or against the food supported either directly, or indirectly, on said shelf.

In order to improve the efficiency of the apparatus and to protect the help, the reflector 9 is insulated from the top of the casing. Also, for convenience of manufacture, the casing body is made in four sections, including two somewhat U-shaped side members $a$—$a$, Fig. 5, to the inner flanges of which the marginal portions of the reflector 9 are secured, while the casing top $b$ is overlapped upon and bolted to the upper edges of the side members $a$—$a$. This arrangement facilitates assembly because the parts 9 and $a$—$a$ may be secured together; the refractory insulation $c$ may then be packed into the casing so assembled, and the cover $b$ later may be secured in place. Suitable end pieces are connected to the parts above mentioned to complete the casing. Or, the entire casing and one end piece can be assembled, filled with insulating material, and the other end piece then secured in place.

The heater 7 is of the strip-type, which is readily obtainable commercially, each strip including two coils. It is wired to a current supply system through a switch 10 which preferably is of the rotary four-position type so as to give low, medium and high heat positions, in addition to an off position.

Preferably the entire casing 6 and the base 2 are made of stainless steel, and the inner surface of the reflector 9 is highly polished. Consequently, when this apparatus is in operation and food, in the usual containers, is placed on the shelf 2, heat is supplied to it from above, partly by direct radiation and partly, also, by reflection from the member 9. In addition, the upper surface of the stainless steel base 2 also acts as a reflector to direct heat which it receives upwardly against the bottoms of the containers resting on the base. Thus, even though the opposite sides of the apparatus between the bottom of the casing and the base 2 are open for the free introduction and removal of the food containers, the heat is mainly confined in the area between these members. The degree of heat so utilized need not be great, a temperature in the neighborhood of 165° or 170° F. at the base 2 having been found ample to hold the food at the proper temperature. It should be noted that the heat supplied by this apparatus is not furnished so much for the purpose of heating the food as it is to conserve the heat in the food when it is placed on the base and to prevent the food from cooling off to an undesirable degree. Also that the sides of the casing are extended downwardly below the level of the heating unit 7 far enough to make it practically impossible for any of the help to touch this unit in connection with placing food on the base or removing it therefrom. Those surfaces of the casing with which the waiters or the cooks are likely to come in contact do not attain a temperature sufficiently high to produce a burn.

It has been found in actual practice that this apparatus solves the problem above referred to with entire satisfaction and does so very economically. For example, an apparatus of the size above mentioned consumes only about 750 watts after once warmed up. The apparatus avoids any cross-traffic between the cooks and the waiters because the cooks are always on one side of this apparatus and the waiters on the other. And it can be so set up in relation to the cooking equipment and the dining-room as to reduce the amount of travel usually required on the part of the help.

In the particular arrangement shown the sub-base 4 consists of a steam table of the type commonly used in restaurants, and the space between the members 2 and 4 may be conveniently utilized for storage of various pieces of equipment; soiled dishes; and the like, it being understood that the sub-base 4 is mounted on legs, or other supports, holding it a suitable distance above the floor.

While I have herein shown and described a preferred embodiment of my invention, it will be evident that the invention may be embodied in other forms without departing from the spirit or scope thereof.

Having thus described my invention, what I desire to claim as new is:

A food conditioning apparatus for restaurants, and the like, comprising an elongated, approximately horizontal base adapted to support simultaneously served dishes containing food, a casing having side members and a detachable top mounted above said base, an elongated reflector, concave in vertical transverse section, detachably secured to said side members, a horizontal heating unit positioned by means of transverse bars mounted on said side members beneath said reflector and extending parallel to said base and substantially the same longitudinal distance as said base, said side members extending downwardly at opposite sides of said unit to a level below said unit thereby protecting the employees from accidentally touching said unit, said casing and said base being separated vertically by a distance providing ample space between them, open at opposite sides, for the placement of orders laterally from either side upon the base and the removal of said orders therefrom, said base having an upper surface which reflects heat generated by said unit directly against the food containers and said reflector being positioned so as to direct heat downwardly upon the food containers, and solid insulating material positioned between the upper surface of said reflector and the adjacent surfaces of said casing thereby preventing the transmission of heat from the unit to the outside surfaces of said casing, a sub-base, legs mounted on said sub-base and supporting said base in an elevated position above the sub-base to form an elongated table providing storage space under the base.

ROBERT D. PARKS.

REFERENCES CITED

The following references are of record in the file of this patent:

UNITED STATES PATENTS

| Number | Name | Date |
|---|---|---|
| 1,645,470 | Alheit | Oct. 11, 1927 |
| 2,260,803 | Dewar | Oct. 28, 1941 |
| 2,261,514 | Dunigan | Nov. 4, 1941 |